United States Patent
Reichard et al.

(10) Patent No.: US 6,755,998 B1
(45) Date of Patent: Jun. 29, 2004

(54) COMPOSITE PANEL ADAPTED FOR POINT COMPRESSIVE LOADS AND METHOD FOR MAKING SAME

(75) Inventors: Ronnal P. Reichard, Melbourne, FL (US); Scott M. Lewit, Indialantic, FL (US); Miles P. Mackaness, Merritt Island, FL (US); Neil A. Rohan, New Smyrna Beach, FL (US)

(73) Assignee: Compsys, Inc., Melbourne, FL (US)

( * ) Notice: Subject to any disclaimer, the term of this patent is extended or adjusted under 35 U.S.C. 154(b) by 34 days.

(21) Appl. No.: 09/697,465

(22) Filed: Oct. 26, 2000

Related U.S. Application Data

(60) Provisional application No. 60/161,561, filed on Oct. 26, 1999.

(51) Int. Cl.[7] .............................................. B29C 44/06
(52) U.S. Cl. ..................... 264/46.5; 264/46.7; 264/257; 264/258
(58) Field of Search .............................. 264/46.5, 46.7, 264/257, 258

(56) References Cited

U.S. PATENT DOCUMENTS

| | | | | | |
|---|---|---|---|---|---|
| 3,007,208 | A | * | 11/1961 | Urban | 264/46.7 |
| 3,013,922 | A | * | 12/1961 | Fisher | 264/46.7 |
| 3,080,267 | A | * | 3/1963 | Schmalz | 264/46.7 |
| 3,124,626 | A | * | 3/1964 | Graham et al. | 264/46.7 |
| 3,282,761 | A | * | 11/1966 | Evangelist | 264/46.7 |
| 3,573,144 | A | * | 3/1971 | Andersen | 428/48 |
| 3,834,962 | A | * | 9/1974 | Strumbos | 264/46.7 |
| 4,022,644 | A | * | 5/1977 | Smith, Jr. | 264/46.7 |
| 4,075,304 | A | * | 2/1978 | Watson | 264/46.7 |
| 4,087,017 | A | * | 5/1978 | Okamoto et al. | 220/560.09 |
| 4,389,447 | A | * | 6/1983 | Disselbeck et al. | 428/178 |
| 4,614,013 | A | * | 9/1986 | Stevenson | 264/46.7 |
| 4,836,964 | A | * | 6/1989 | Tsai | 264/46.7 |
| 5,043,114 | A | * | 8/1991 | Saito et al. | 264/46.7 |
| 5,056,199 | A | * | 10/1991 | Stein et al. | 264/46.7 |
| 5,429,066 | A | | 7/1995 | Lewit et al. | |
| 5,549,771 | A | * | 8/1996 | Brooker | 264/46.7 |
| 5,580,502 | A | * | 12/1996 | Forster et al. | 264/46.5 |
| 5,632,940 | A | * | 5/1997 | Whatley | 264/46.7 |
| 5,897,818 | A | | 4/1999 | Lewit et al. | |
| 6,013,213 | A | | 1/2000 | Lewit et al. | |
| 6,355,339 | B1 | * | 3/2002 | Sherwood | 264/46.7 |

FOREIGN PATENT DOCUMENTS

| | | | | |
|---|---|---|---|---|
| JP | 59-176147 | * | 10/1984 | 264/46.7 |
| JP | 61-35912 | * | 2/1986 | 264/46.7 |
| JP | 62-59013 | * | 3/1987 | 264/46.7 |

* cited by examiner

Primary Examiner—Allan R. Kuhns
(74) Attorney, Agent, or Firm—Sacco & Associates, PA

(57) ABSTRACT

A method for making a composite panel includes the step (26) of providing a panel having elongated channels (14) that are positioned along areas of anticipated point compression loading. The panel (10) has a reinforcing fabric layer (41) attached to a non-woven fabric layer (43) forming an outside layer (12). The composite panel has foam core (8,9) within the outside layer. The method further comprises the step (27) of providing structural foam channel inserts (16) having an outer fabric layer (18), wherein the channel inserts have a cross section which matches the cross-sectional profile of each of the elongated channels of the panel. Resin is then applied to the outside layer of the panel and outer fabric layer of the channel inserts such the channel inserts are positioned within the channels of the panel (29 and 31). The resin is then allowed to cure (33) forming a composite structure.

25 Claims, 5 Drawing Sheets

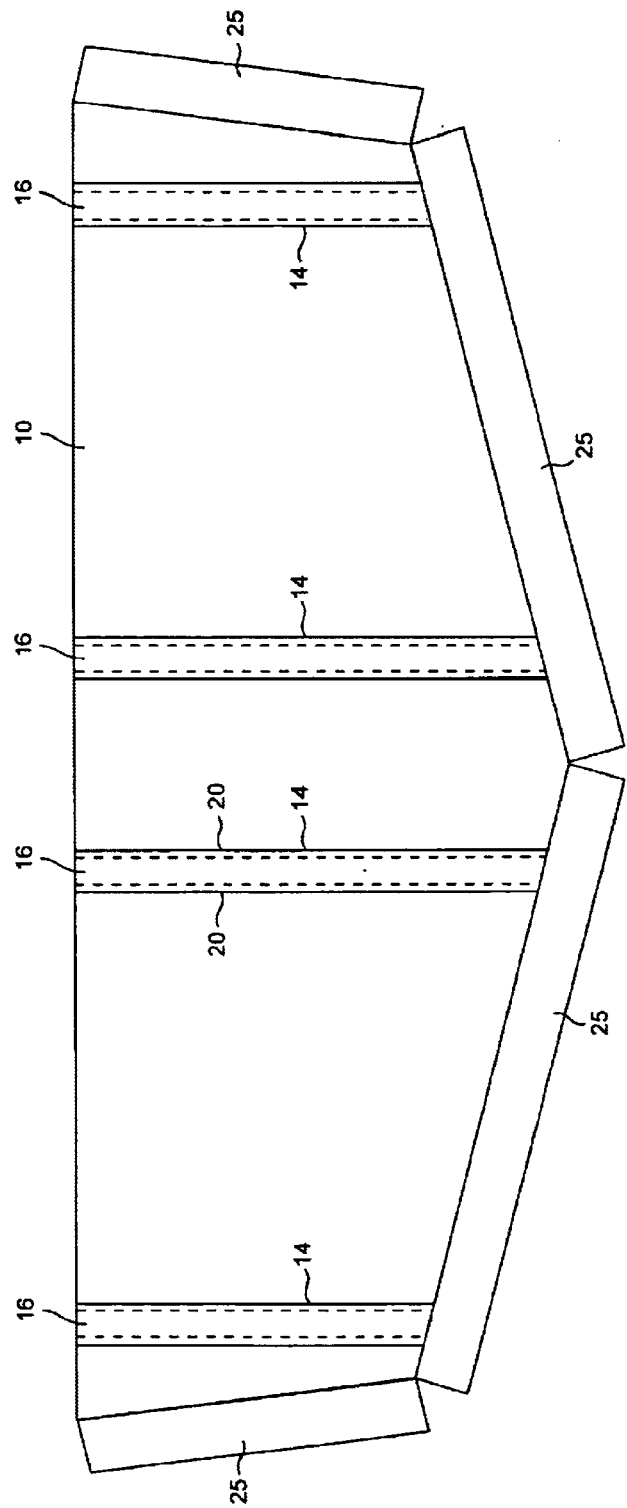
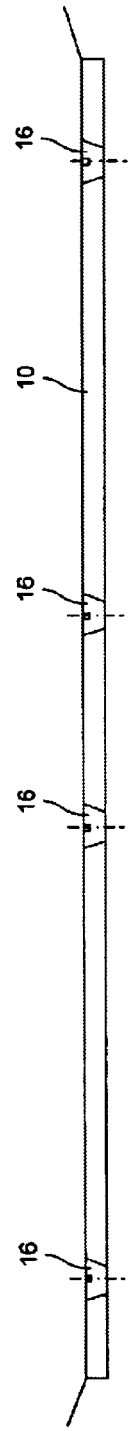
Fig. 1A
Fig. 1B

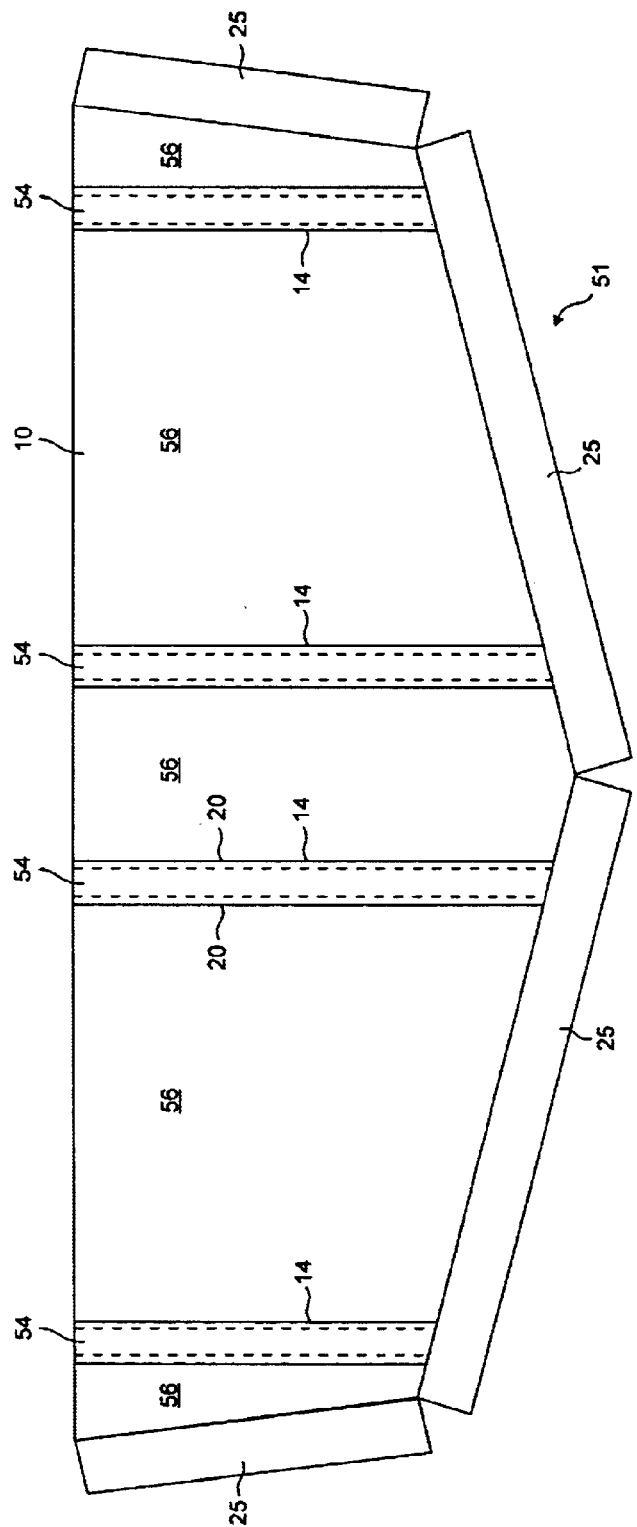
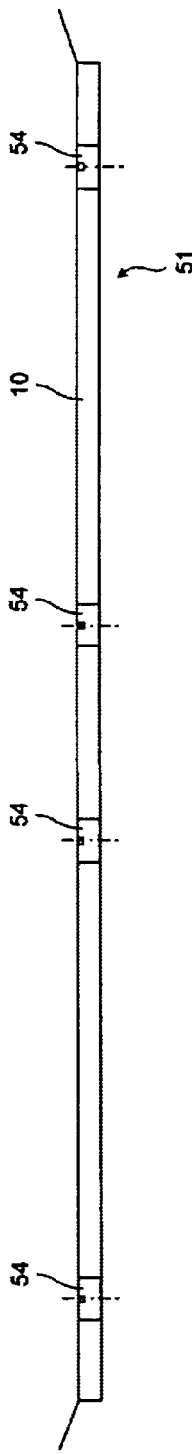
Fig. 5A
Fig. 5B

COMPOSITE PANEL ADAPTED FOR POINT COMPRESSIVE LOADS AND METHOD FOR MAKING SAME

CROSS REFERENCE TO RELATED APPLICATIONS

This application claims the benefit of U.S. Provisional Application 60/161,561 entitled, "COMPOSITE PANEL ADAPTED FOR POINT COMPRESSIVE LOADS AND METHOD FOR MAKING SAME," filed Oct. 26, 1999, the entirety of which is incorporated herein by reference.

BACKGROUND OF THE INVENTION

1. Field of Invention

This invention relates to a composite structures and more particularly, the to composite structures which are especially adapted for forming high strength panels suitable for use in applications requiring a capability to withstand point compression loading without deformation.

2. Description of the Related Art

Composite panels are commonly used in various applications such as cargo containers, vehicles, and boats. In the past, boat transoms have been developed using a variety of different technologies. One prior art technique for forming transoms uses plywood as the core of a sandwich laminate. The plywood acts to augment the structural properties of the fabric layer skins of the transom. Advantageously, plywood provides a low-cost means for strengthening the transom. Additionally, plywood has excellent compressive strength for through bolting and outboard motor clamps. One significant drawback to working with plywood, however, is that it tends to decay significantly, often within five to seven years.

Another prior art technique for forming transoms uses a high-density structural foam core rather than a plywood core. The high-density structural foam is commonly formed from cross-linked PVC or very high-density urethane. Transoms having high-density structural foam cores commonly maintain their structural integrity for up to ten years. High-density structural foam is considerably more expensive than plywood, however, and is not cost effective to use throughout the entire transom. The high-density foam resists compression resulting from point loading of the transom panel associated with motor mounting bolts. It should be noted that even high density foam will be subject to creep or relaxation over time and in some instances over temperature variations. Yet another prior art technique for forming a transom includes a composite of both high and lower density structural foams. In this technique, high-density structural foam is provided only in areas, which will support through bolts and/or outboard motor clamps, and low-density structural foam is provided in the remaining portions of the transom core. There are several drawbacks to this technique. One drawback is that during transom manufacturing with structural foam, the structural foam is typically attached to a mold using only a few large C-clamps. This attachment structure is not acceptable for a composite structure formed from numerous pieces of foam because each piece of foam would not be attached to the mold. An additional drawback is that properly combining the high and low-density structural foams requires a high degree of precision, and is therefore costly. Besides cost, the techniques previously discussed are poorly designed for manufacturability and production.

U.S. Pat. No. 5,429,066 to Lewit et al. involves manufacturing a composite structure that has a reinforced fabric layer. A non-woven fabric layer, such as a mat fiber layer, is attached to the reinforcing fabric layer. A structural foam is attached to the non-woven fabric layer on the side of the non-woven fabric layer opposite the reinforcing fabric by filling the interstices of the non-woven fabric layer. However, the Lewit. '066 structure suffers from the inability to resist point compression loads such as those associated with outboard motor mounting bolts.

U.S. Pat. No. 5,908,591 to Lewit et al. involves manufacturing a composite structure having a structure similar to Lewit '066. Significantly, however, the Lewit '591 composite structure does not make use of a second reinforcing fabric layer. Instead, penetration of the structural foam is controlled so as to leave an outer portion of the fabric layer of the cured composite structure substantially free of cured resin.

Thus, a need exists for a composite structure that is easily manufacturable and that is able to resist point compression loads such as those associated with outboard motor mounting bolts.

SUMMARY OF THE INVENTION

A composite panel and a method for making same is disclosed which is formed of a foam core and is able to resist compression caused by point compressive loads. In a first aspect of the present invention the method preferably comprises the steps of providing a panel having elongated channels formed therein which are positioned along areas of anticipated point compression loading. The panel is preferably constructed by attaching a reinforcing fabric layer to a non-woven fabric layer forming an outside layer. Additionally, the panel has foam core within the outside layer. The method further comprises providing structural foam channel inserts having an outer fabric layer, wherein the channel inserts have a cross section that matches the cross-sectional profile of each of the elongated channels of the panel. Resin is then applied to the outside layer of the panel and outer fabric layer of the channel inserts such the channel inserts are positioned within the channels of the panel. The resin is then allowed to cure forming a composite structure.

In a second aspect of the present invention, a method of forming high strength panels comprises the steps of providing a panel by attaching a reinforcing fabric layer to a non-woven fabric layer forming an outside layer, wherein the outside layer forms opposing panel surfaces. A plurality of point compressive load bearing members are then arranged between the opposing panel surfaces along areas of anticipated point compression loading, wherein the plurality of point compressive load bearing members forms elongated channels which are applied transversely to opposing surfaces of the panel. The panel and the plurality of point compressive load bearing members are placed within a mold and the plurality of point compressive load bearing members are then secured in place within the panel by injecting the mold with foam providing a foam core to the panel.

In a final aspect of the present invention, a composite structure comprises a panel having elongated channels formed therein which are positioned along areas of anticipated point compression loading, wherein the panel is arranged and constructed by attaching a reinforcing fabric layer to a non-woven fabric layer forming an outside layer. The composite structure further comprises a plurality of structural foam channel inserts, each insert formed from attaching a reinforcing fabric layer to a non-woven fabric layer to form an outside layer, wherein the channel inserts have a cross section which matches the cross-sectional profile of each of the elongated channels of the panel. Structural foam is attached to the non-woven fabric layer of each of the panel and the plurality of structural foam channel inserts, wherein the structural foam fills interstices of the non-woven fabric layer without penetrating into the reinforcing fabric layer. The plurality of structural foam inserts are mated with the elongated channels of the panel after being saturated with curable resin after the structural foam has been attached to the non-woven fabric layer of each of the channel inserts and of the panel.

BRIEF DESCRIPTION OF THE DRAWINGS

Having briefly described the invention, the same will become better understood from the following detailed discussion, read in conjunction with the drawings wherein:

FIG. 1A is a front elevation view of a panel formed in accordance with the invention.

FIG. 1B is a top view of the panel of FIG. 1A.

FIG. 5A is a front elevation view of a panel formed in accordance with an alternative embodiment of the invention.

FIG. 5B is a top view of the panel of FIG. 5A.

DETAILED DESCRIPTION OF THE PREFERRED EMBODIMENTS

Figure 2:
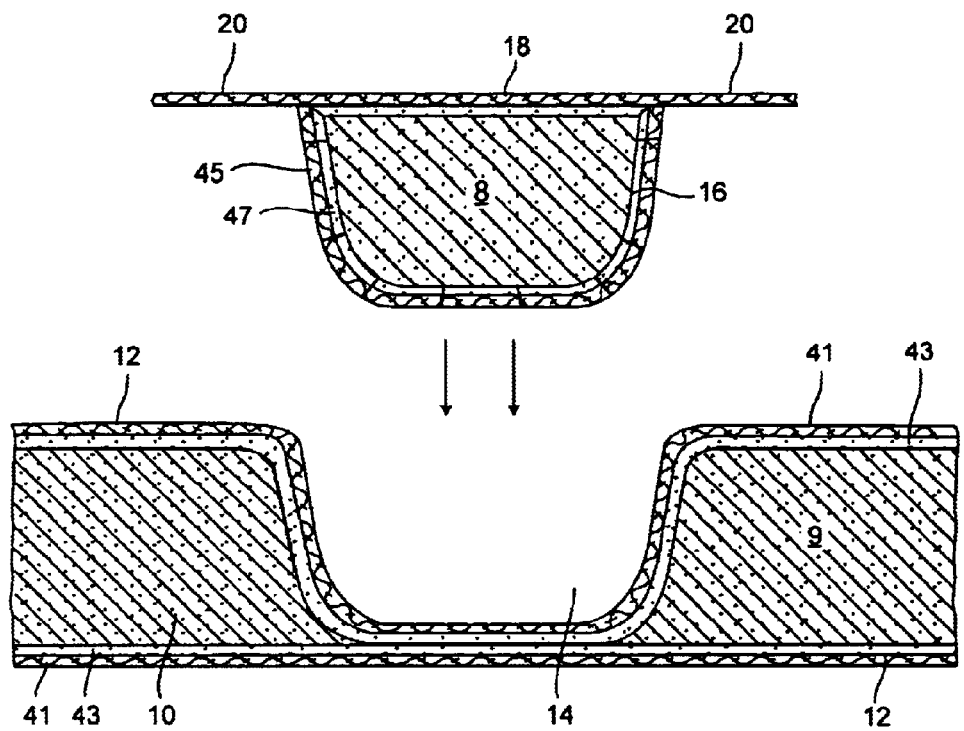
FIG. 2 is an enlarged cross-sectional view of a channel insert positioned for placement within a channel to form the panel of FIG. 1.
Figure 3:
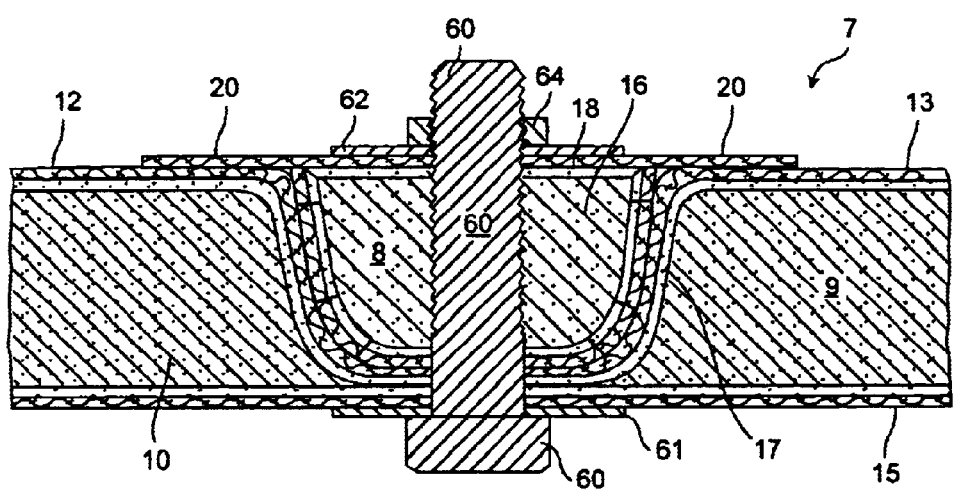
FIG. 3 is an enlarged cross-sectional view of a channel insert positioned within a channel to form the panel of FIG. 1.

FIGS. 1–3 illustrate a construction for a composite panel in accordance with the invention. The composite panel 7 has a structural foam core 8, 9 and includes one or more outer fabric layers 12, 18 securely attached or fitted thereto. As best shown in FIGS. 2 & 3, the fabric layers 12, 18 can be arranged to continuously extend between a first surface 13 of the panel to a second surface 15, so as to traverse through the foam core. The fabric layers thus arranged are soaked in resin and allowed to cure so as to form a rigid cross brace 17 between the panel surfaces 13, 15. The cross bracing 17 resists deformation under conditions of point compression loading applied along an axis perpendicular to the panel surfaces 13 and 15. Referring to FIG. 3, a bolt 60 is optionally shown illustrating a condition of point compression loading upon the composite panel 7. The bolt 60 would be secured in place through the channel insert 16 using washers 61 and 62 and corresponding bolt 64.

The fabric layer 12 is preferably formed from a reinforcing fabric layer 41 and a non-woven inner fabric layer 43, but may alternatively be formed from just a single fabric layer composed of fiberglass mat for example. The reinforcing fabric layer 41 can be formed of any suitable reinforcing fibers. However, the reinforcing fabric layer 41 is preferably a plurality of directional reinforcing fabric layers of organic or inorganic structural reinforcing fabrics such as such as fiberglass, carbon fibers, aramid fibers such as is available under the name Kevlar, linear polyurethane or polypropylene fibers such as is available under the name Spectra, or polyester fibers. By reinforcing fabric is meant a fabric which when added to a composite material enhances the structural properties of the material. The fabrics can be randomly oriented, or preferably, can be oriented in one or more directions. While a number of specific types of materials have been given for use as the reinforcing fabric layer 12, it will be appreciated by those of ordinary skill in the art that other equivalent-type reinforcing fabric layers can be employed in the practice of the invention.

According to a preferred embodiment, the fabric layers can be formed and attached to the foam cores 8, 9 as described in U.S. Pat. Nos. 5,429,066 and 5,908,591 to Lewit, which disclosures are expressly incorporated herein by reference. As disclosed in the '066 patent, an inner fabric layer 43 of fabric layer 12 can be a non-woven fabric composed of continuous thermoplastic fiber, needle punched together to yield a felt-like fabric. One example of such a fabric is Trevira Spunbond, which is commercially available from Hoechst Celanese Corporation. However, the invention is not limited in this regard and the inner fabric layer may be comprised of other materials, including polyester staple mat and glass fiber mat, as well as other organic and inorganic fiber mats and fabrics. It should be understood that fabric layer 18 might be comprised of a reinforcing fabric layer 45 and a non-woven inner fabric layer 47 similar to fabric layers 41 and 43 respectively.

Preferably the foam cores 8, 9 are formed of a self-expanding, self-curing urethane foam. The foam preferably expands and penetrates into the interstices of an inner one (43) of the fabric layers 12 by filling into a mold in an amount sufficient to cause pressure as a result of expansion. of the foam 8, 9. Such self-rising, self-curing foam is preferably a urethane foam commercially available from BASF, MOBAY, PPG and is typically an MDI-based rigid polyurethane foam (methylene-diphenyl-methane diisocyanate) using "hydrogenated chlorofluorocarbons" (HCFC), water and/or $CO_2$ as a blowing agent. However, the invention is not limited in this regard, and any other suitable self-expanding structural foam can be used for this purpose.

As an alternative, the fabric layers 12 can be attached or fitted to structural foam cores 8, 9 by any other suitable means. For example, adhesives, stitching, clamps and suitably designed clips can also be used to attach the fabric layers 12 to the foam cores. Thus, the invention is not limited to the specific attachment method disclosed in the Lewit '066 and '591 patents.

Those skilled in the art will appreciate that the composite panel as described herein can serve In a wide variety of applications wherein a panel must be capable of withstanding point compressive loads without deformation. For example, in one embodiment the panel can be used to form a boat transom. In that case, a plurality of fabric flaps 25 can be positioned around the outer edges of the fabric layer 12, in order to permit the transom to be laminated into a boat construction. The flaps 25 are preferably formed of the same reinforcing material as fabric 12. Likewise, the channels inserts 16 may further include flaps 20 as shown that would allow for a smoother surface transition between the channel insert 16 and panel forming the composite panel. The flaps 20 would preferably be formed of the same reinforcing material as fabric 12 or 18.

Figure 4:
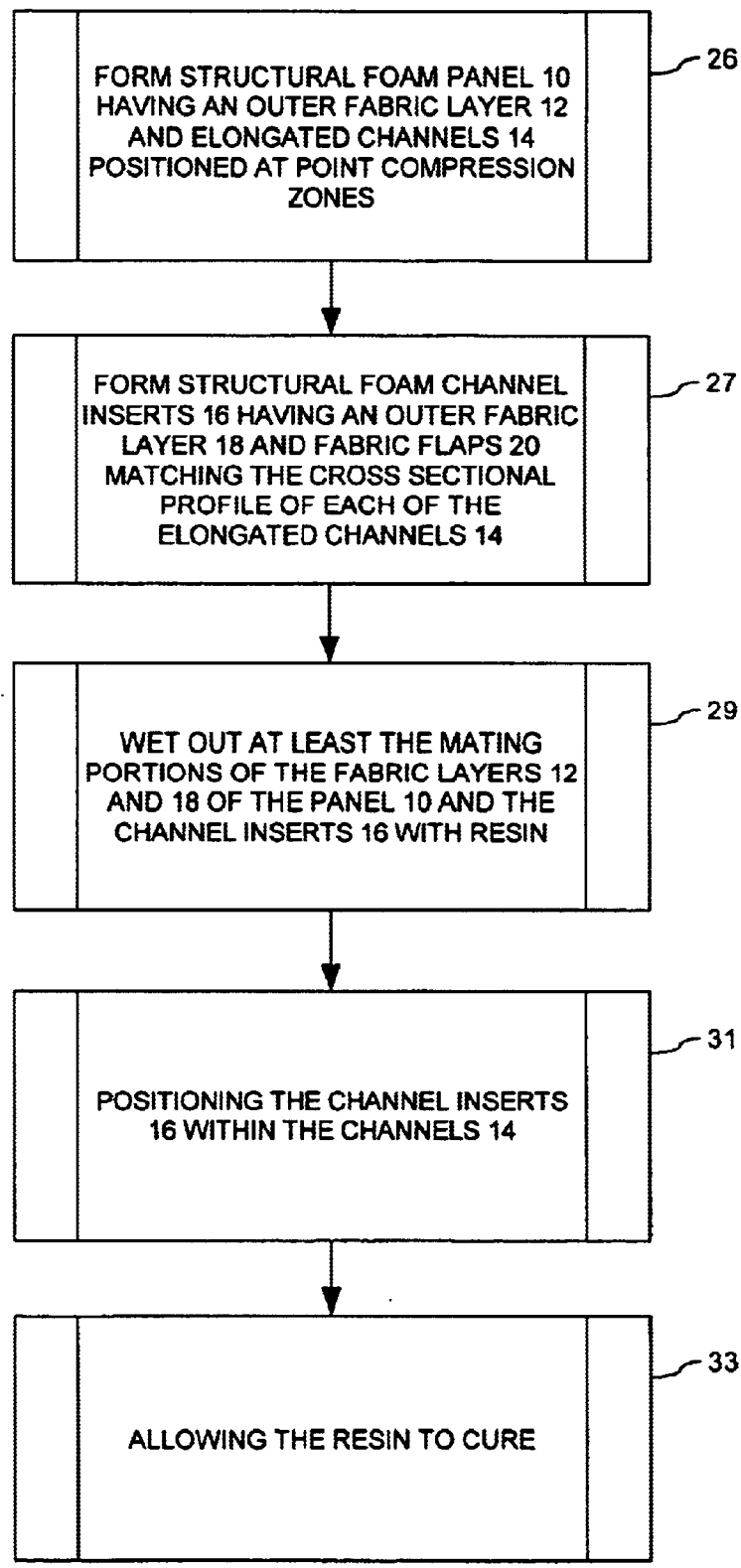
FIG. 4 is a flow chart showing a method form making the panel of FIG. 1.

The method of making the composite structure in accordance with the invention is illustrated in FIGS. 2, 3, and 4.

Referring now to FIG. 4, a structural foam panel 10 is formed is formed in step 26. The panel 10 has elongated channels 14 formed therein that are positioned along areas of anticipated point compression loading. The structural foam panel 10 includes an outer fabric layer 12 which is formed and attached as described above. At step 27, structural foam channel inserts 16 are formed having an outer fabric layer 18 and fabric flaps 20. The channel inserts 16 have a cross section that matches the cross-sectional profile of each of the elongated channels 14. The foam cores 8 and 9 of channel inserts 16 and panel 10 are preferably formed from low-density urethane foam as described above.

In step 29, at least the mating portions of the fabric layers 12, 18 of the panel 10 and the channel inserts 16 are wet out with resin. In accordance with step 31, the channel inserts 16 are then positioned within the channels 14. According to step 31, the resin is allowed to cure, forming the composite structure. Further, if only the mating portions are wet out with resin, then the remainder of the structure remains free of resin. Advantageously, a composite structure formed in accordance with these inventive steps can withstand point compression loads. For example, the composite structure can accommodate a bolt or an outboard motor clamp.

Figure 6A:
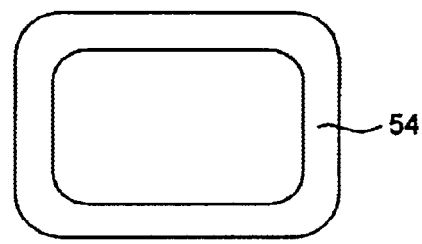
FIG. 6A shows a load bearing member that can be used with the present invention.
Figure 6B:
FIG. 6B shows a pair of fabric layers in a mold, ready for positioning of a load-bearing member therein.
Figure 6B:
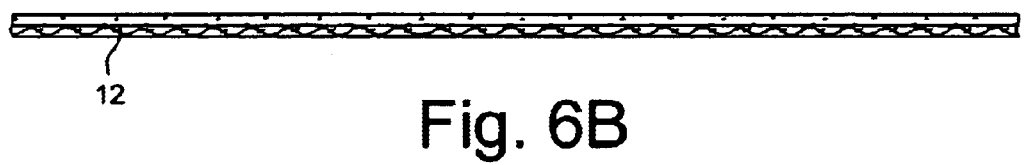
Figure 7:
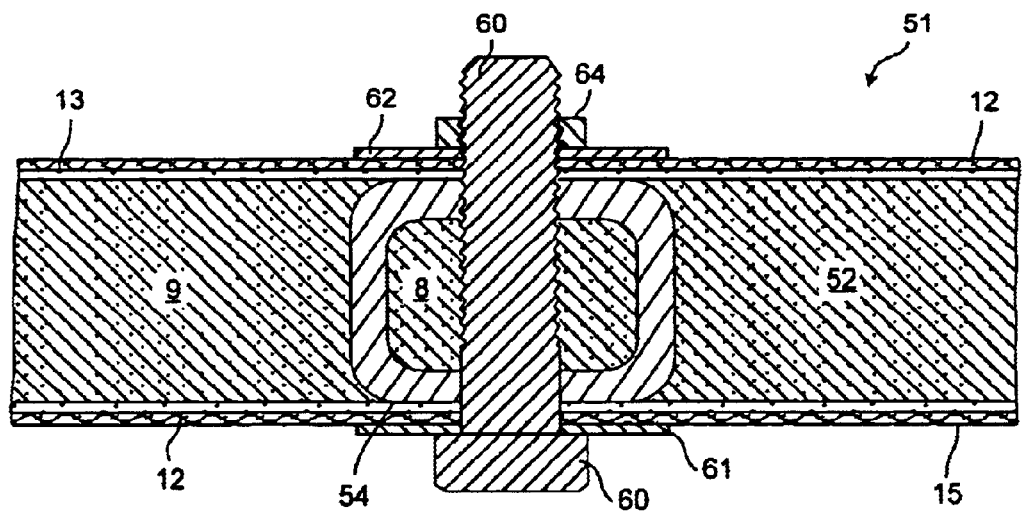
FIG. 7 is an enlarged cross-sectional view of a load-bearing member positioned within the panel of FIG. 5.

An alternative embodiment of the invention is shown in FIGS. 5–7. In FIGS. 14 and 5–7, elements commonly represented are designated by the same reference numerals. Referring now to FIGS. 5 and 7, a composite panel 51 is illustrated. As best shown in FIG. 7, composite panel 51 is comprised of a foam core 52 and a point compressive load-bearing member 54 as shown in FIG. 6a. Load bearing member 54 is preferably formed of metal or other rigid materials sufficient to resist point compressive loading applied transversely to opposing panel surfaces 13 and 15. For example, it can be formed of steel, aluminum or any other suitable metal or alloy. In a preferred embodiment, the load-bearing member can have a square or rectangular profile as shown. However, the invention is not limited in this regard and any other suitable cross-sectional profile can also be used. The load-bearing member 54 is positioned between opposing fabric layers 12. Referring to FIG. 7, a bolt 60 is optionally shown illustrating a condition of point compression loading upon the composite panel 51. The bolt 60 would be secured in place through the load-bearing member 54 using washers 61 and 62 and corresponding bolt 64. According to a preferred embodiment, the surfaces of the load-bearing member are in contact with fabric layers 12 traversing the surfaces 133 15 of the panel 51. A structural foam core 8, 9 preferably is injected to fill the remaining space between opposing fabric layers and within the load-bearing member as shown. The fabric 12 and foam core 8, 9 are preferably formed of the materials as described above. It should be understood that it may not be necessary to fill the load bearing member 54 with foam and the interpretation of the scope of the claims should not be limited in this respect.

According to one embodiment, the panel 51 can be formed by positioning reinforcing members 54 and fabric layers 12 in a mold, and injecting the mold with foam as described in U.S. Pat. No. 5,429,066 to Lewit. The foam can then be permitted to cure to form a composite article that has an exposed reinforcing fabric layer that is ready to be laminated into a larger composite structure such as a boat.

According to another embodiment, preformed structural foam panels 56 can be arranged on adjacent sides of each load-bearing member 54 as shown in FIG. 5. Subsequently, an outer fabric layer can be attached or fitted around the entire assembly of foam panels 56 and load bearing members. The panel can then be immediately welled out with resin and allowed to cure to form a rigid foam core panel. Alternatively, the entire assembly can be clipped, clamped or otherwise held together by suitable fasteners, without applying resin, such that the panel 51 has an exposed reinforcing fabric layer 12 which is free of resin and suitable for lamination into a larger composite structure such as a boat, cargo container, truck side panel or wall panel, among other composite structures.

We claim:

1. A method of forming high strength panels suitable for use in applications requiring a capability to withstand point compression loading without deformation, comprising the steps of:

positioning a first fabric layer spaced from a second fabric layer to form opposing panel surfaces;

fixing a foam core between at least a portion of said fabric layers to form said panel;

defining in at least one of said opposing panel surfaces an elongated channel having a cross-sectional profile;

forming a rigid point compressive load bearing member having a structural foam core, an outer fabric layer including fabric flaps and said cross-sectional profile of said elongated channel;

applying resin to said flaps and mating surfaces of the rigid point oppressive load bearing member and said elongated channel;

positioning said rigid point compressive load bearing member in said elongated channel after said applying step; and allowing said resin to cure to provide along a length of said rigid point compressive load bearing member a greater resistance to point compression as compared to a remaining portion of said panel exclusive of said rigid point compressive load bearing member.

2. The method according to claim 1 further comprising the step of forming at a periphery of said opposing panel surfaces a plurality of fabric tabs attached to at least one of said first and second fabric layers.

3. The method according to claim 1 further comprising the step of laminating said panel into a composite boat hull to form a transom.

4. The method according to claim 1 further comprising the step of injecting a curable structural foam in a space between said opposing panel surfaces while constraining the first and second fabric layers from movement so as to form said foam core.

5. The method according to claim 4, further comprising the step of constraining said foam under a molding pressure selected to cause said foam to penetrate only partially through an inner thickness of said first and second fabric layers so as to leave an outer exposed portion of said fabric layer free of said structural foam.

6. The method according to claim 4 further comprising the step of attaching a non-woven fabric layer to a reinforcing fabric layer to form each of said first and second fabric layers.

7. The method according to claim 6 further comprising the step of arranging said first and second fabric layers so that said reinforcing fabric layer forms an outer panel surface and said non-woven fabric layer forms an inner panel surface.

8. The method of claim 6, further comprising the step of selecting said reinforcing fabric layer from the group consisting of fiberglass, carbon fibers, aramid fibers, linear polyurethane fiber, polypropylene fibers, and polyester.

9. The method of claim 6, further comprising the step of selecting the non-woven fabric layer from the group consisting of polyester staple mat, glass fiber mat, a continuous thermoplastic fiber which is needle punched to form a felt-like fabric, or other organic and inorganic fiber mats and fabrics.

10. A method for manufacturing a composite boat transom comprising the steps of:
   positioning a first fabric layer spaced from a second fabric layer to form opposing transom surfaces;
   positioning elongated rigid channel members between said first and second fabric layers aligned with locations corresponding to areas of anticipated point compressive loading; and
   injecting a foam core between said first and second fabric layers.

11. The method according to claim 10 further comprising the step of aligning said elongated rigid channel members with an anticipated location of a bolt for an outboard motor bracket.

12. The method according to claim 11 further comprising the step of selecting said elongated rigid channel members to be formed of metal.

13. The method according to claim 10 further comprising the step of injecting said foam core within said rigid channel members.

14. The method according to claim 10 further comprising the step of forming said first and second fabric layers to include fabric flaps at a periphery of said composite transom.

15. The method according to claim 14 further comprising the step of positioning said composite transom to form part of a composite boat hull and laminating said exposed reinforcing fabric flaps into said composite boat hull.

16. The method according to claim 10 wherein said injecting step further comprises causing said foam core to penetrate at least partially into interstices of said fabric layer to bind said foam core to said fabric layers.

17. A method for manufacturing a composite boat transom comprising the steps of:
   positioning a first fabric layer spaced from a second fabric layer to form opposing transom surfaces;
   positioning elongated rigid channel members between said first and second fabric layers aligned with locations corresponding to areas of anticipated point compressive loading associated with an outboard motor bracket;
   injecting a foam core between said first and second fabric layers; and
   causing said foam core to penetrate at least partially into interstices of said fabric layers to bind said foam core to said fabric layers.

18. The method according to claim 17 further comprising the step of selecting said elongated rigid channel members to be formed of metal.

19. The method according to claim 18 further comprising the step of injecting said foam core within said rigid channel members.

20. The method according to claim 17 further comprising the step of forming said first and second fabric layers to include fabric flaps at a periphery of said composite transom.

21. A method of forming high strength panels suitable for use in applications requiring a capability to withstand point compression loading without deformation, comprising the steps of:
   positioning a first fabric layer spaced from a second fabric layer to form opposing panel surfaces;
   fixing a foam core between at least a portion of said fabric layers to form said panel;
   positioning at least one rigid point compressive load bearing member between portions of said foam core along areas of anticipated point compression loading in a location to prevent compression of said foam core when a point compressive load is applied to said point compressive load bearing members; and
   selecting said point compressive load bearing member to be an elongated channel formed of a material selected from the group consisting of steel, aluminum and a metal alloy.

22. A method of forming high strength panels suitable for use in applications requiring a capability to withstand point compression loading without deformation, comprising the steps of:
   positioning a first fabric layer spaced from a second fabric layer to form opposing panel surfaces;
   fixing a foam core between at least a portion of said fabric layers to form said panel;
   positioning at least one rigid point compressive load bearing member between portions of said foam core along areas of anticipated point compression loading in a location to prevent compression of said foam core when a point compressive load is applied to said point compressive load bearing members; and
   forming at a periphery of said opposing panel surfaces a plurality of fabric tabs attached to at least one of said first and second fabric layers.

23. A method of forming high strength panels suitable for use in applications requiring a capability to withstand point compression loading without deformation, comprising the steps of:
   positioning a first fabric layer spaced from a second fabric layer to form opposing panel surfaces;
   fixing a foam core between at least a portion of said fabric layers to form said panel;
   positioning at least one rigid point compressive load bearing member between portions of said foam core along areas of anticipated point compression loading in a location to prevent compression of said foam core when a point compressive load is applied to said point compressive load bearing members; and
   laminating said panel into a composite boat hull to form a transom.

24. A method of forming high strength panels suitable for use in applications requiring a capability to withstand point compression loading without deformation, comprising the steps of:
   positioning a first fabric layer spaced from a second fabric layer to form opposing panel surfaces;
   positioning a rigid point compressive load bearing member between said first and second fabric layers along areas of anticipated point compression loading; and
   injecting a foam core between at least a portion of said first and second fabric layers to form said panel, wherein said rigid point compressive load bearing member prevents compression of said foam core when a point compressive load is applied to said point compressive load bearing member; and
   injecting a foam core into said rigid point compressive load bearing member.

25. A method of forming high strength panels suitable for use in applications requiring a capability to withstand point compression loading without deformation, comprising the steps of:

positioning a first fabric layer spaced from a second fabric layer to form opposing panel surfaces;

positioning a rigid point compressive load bearing member between said first and second fabric layers along areas of anticipated point compression loading; and injecting a foam core between at least a portion of said first and second fabric layers to form said panel, wherein said rigid point compressive load bearing member prevents compression of said foam core when a point compressive load is applied to said point compressive load bearing member; and selecting said rigid point compressive load bearing member to be an elongated channel formed of a material selected from the group consisting of steel, aluminum and a metal alloy.

* * * * *

UNITED STATES PATENT AND TRADEMARK OFFICE
CERTIFICATE OF CORRECTION

PATENT NO. : 6,755,998 B1  
DATED : June 29, 2004  
INVENTOR(S) : Reichard et al.

It is certified that error appears in the above-identified patent and that said Letters Patent is hereby corrected as shown below:

Column 5,  
Line 25, delete "14" and replace with -- 1-4 --.  
Line 47, delete "133" and replace with -- 13, --.

Column 6,  
Line 1, delete "welled" and replace with -- wetted --.  
Line 27, delete "oppressive" and replace with -- compressive --.

Signed and Sealed this

Tenth Day of May, 2005

JON W. DUDAS  
*Director of the United States Patent and Trademark Office*